United States Patent [19]

Repka

[11] 4,186,519

[45] Feb. 5, 1980

[54] CB VEHICLE TOY

[76] Inventor: David F. Repka, Rte. 2, Box 321, Midlothian, Tex. 76065

[21] Appl. No.: 826,165

[22] Filed: Aug. 19, 1977

[51] Int. Cl.$^2$ .............................................. A63H 17/32
[52] U.S. Cl. ........................................ 46/202; 46/232
[58] Field of Search .................. 46/111, 175, 202, 232

[56] References Cited

U.S. PATENT DOCUMENTS

| | | | |
|---|---|---|---|
| 3,080,678 | 3/1963 | Girz | 46/232 |
| 3,120,716 | 2/1964 | Orenstein | 46/232 |
| 3,425,156 | 2/1969 | Field | 46/232 |
| 3,523,388 | 8/1970 | Glass et al. | 46/111 |
| 3,600,848 | 8/1971 | Marshall | 46/111 |

*Primary Examiner*—Louis G. Mancene
*Assistant Examiner*—Robert F. Cutting

[57] ABSTRACT

A toy vehicle such as a child's toy truck or tricycle which includes a toy citizens band radio is disclosed. A microphone of the CB vehicle toy is detachable from the vehicle body except for an electrical wire connecting the microphone to the electronics in the vehicle toy. The microphone is designed to be hand-held by a child playing with the toy. When the toy CB radio is turned on and the transmit button on the microphone is on, then sounds received by the microphone are transmitted through a speaker associated with the vehicle toy. In the receive mode, the toy CB radio generates static similar to that heard over a real CB radio when receiving.

8 Claims, 5 Drawing Figures

CB VEHICLE TOY

BACKGROUND OF THE INVENTION

This invention relates to vehicle toys and in one of its aspects to a citizens band radio truck toy. Another aspect of this invention relates to a citizens band radio tricycle.

In the past, vehicular toys have come equipped with apparatus for generating acoustic signals as is shown in U.S. Pat. No. 3,080,678 issued to Girz. The Girz invention relates to vehicular toys which have an acoustic signaling device for producing musical or noisy sounds such as the sounds made by an automotive vehicle including horns or sirens.

Some toy vehicles have come equipped with phonographs as shown in U.S. Pat. No. 3,523,388 issued to Glass, et al and U.S. Pat. No. 3,600,848 issued to Marshall so that as the toy is pulled or pushed, the phonograph record played the prerecorded sounds. In all of these vehicular toys, the varieties of sound made by a particular vehicle were limited, and none of the sounds were of the child's own creation such as through a microphone that would pick up the child's voice.

Toy radio stations have been used in the past to allow a child to simulate the actions of a radio station operator. One such toy radio station is shown in U.S. Pat. No. 3,813,373 issued to Heller. The Heller patent discloses a radio station with some features of a telephone system and some features of an audible signal system. The toy radio stations of the past were substantially stationary in character. Further, the toy radio stations did not allow most children to simulate the activities of adults which the children could observe first hand since not many adults operate sophisticated radio stations.

SUMMARY OF THE INVENTION

It is thus an object of the present invention to provide a vehicular toy including a radio such that a child can simulate the activities of a class of adults which the child can observe.

It is a further object of this invention to provide a toy CB radio which exhibits many of the characteristics of a real CB radio.

Another object of this invention is to provide a moderate cost, entertaining toy.

A preferred embodiment of the current invention includes a toy truck with a microphone, switchable between on and off, detachably mountable on the vehicle body, and a speaker mounted in the engine compartment of the toy truck. The toy truck also includes a source of electrical power and an electric circuit, switchable between on and off, incorporating the electrical power source, the microphone and the speaker. The electrical circuit includes a means for generating audible noise from the speaker when the circuit is on and the microphone is off, and means for transmitting electrical signals from the microphone to the speaker when the circuit is on and the microphone is also on.

Another embodiment of the current invention is a tricycle including a toy citizens band radio as described.

These and other objects, advantages and features of this invention will be apparent from the following description taken with reference to the accompanying drawings, wherein is shown the preferred embodiments of the invention.

DESCRIPTION OF THE PREFERRED EMBODIMENTS

Figure 1:
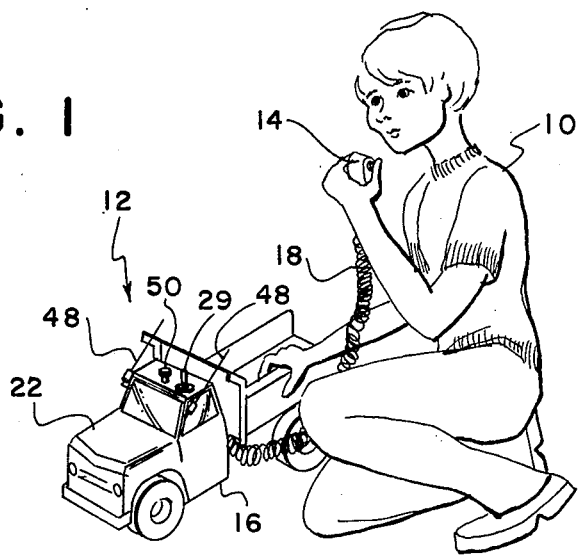
FIG. 1 is a pictorial representation of a child playing with a toy utilizing this invention.

Referring now the the drawings, in FIG. 1 a child 10 is illustrated playing with a CB truck toy 12 according to this invention. Child 10 holds a microphone 14 in his left hand. Microphone 14 is switchable between on and off by means of a microphone switch 15, shown in FIG. 2, and is connected to a truck 16 by electrical cord 18 which is preferably a coiled wire as often used with citizens band radios.

Figure 2:
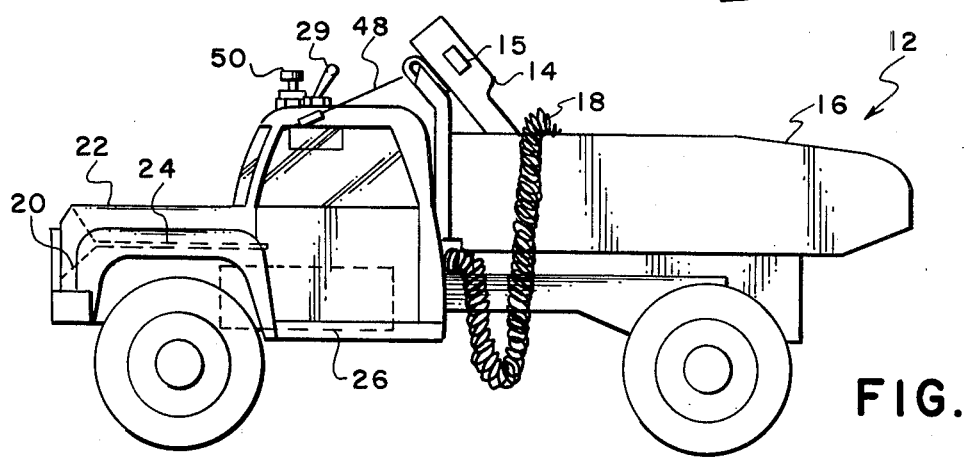
FIG. 2 is a side elevational view of a toy truck in accordance with this invention.

A speaker 20 for converting electrical signals into sound is mounted toward the front of engine compartment 22 as shown in FIG. 2. Most of the electrical components of the CB vehicle toy are mounted on circuit board 24 within engine compartment 22. An electrical power source for operating the CB truck toy 12 such as a 9 volt transistor battery 26 is preferably mounted underneath truck body 16 so that the battery or batteries are easily accessible but still hidden from view in normal use.

Figure 3:
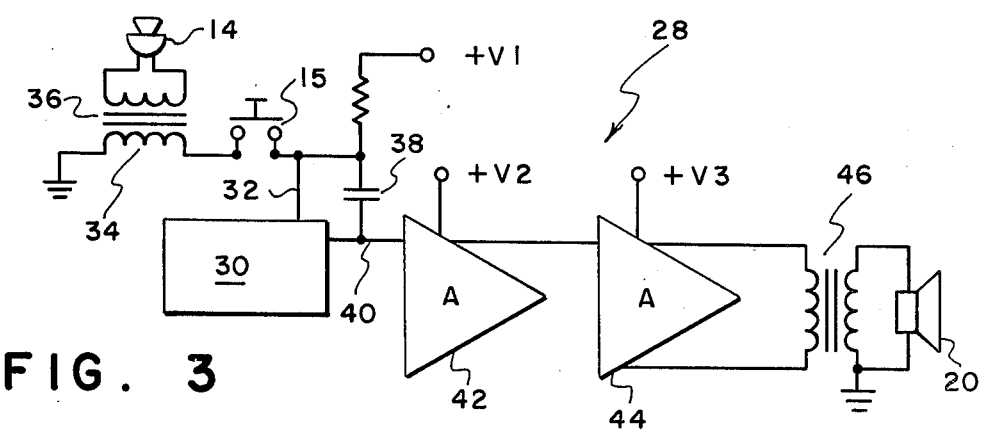
FIG. 3 is a block diagram and partial electrical schematic diagram of an electrical circuit in accordance with this invention.

One embodiment 28 of the electrical circuit of this invention is illustrated in partial block diagram and partial schematic illustration in FIG. 3. Electrical circuit 28 is switchable between on and off by means of power switch 29 and incorporates electrical power source 26 which supplies the power for the biasing voltages V1, V2 and V3. Electrical circuit 28 further incorporates microphone 14 and speaker 20.

When power is available at V1, and microphone switch 15 is not depressed, then power is supplied at node 32 to a noise generator 30. When microphone switch 15 is depressed, on the other hand, there is a DC short circuit to ground since only microphone switch 15 and a winding 34 of a microphone input transformer 36 are in series between node 32 and ground, and both are DC short circuits.

When power is available at V1 and microphone switch 15 is depressed, the electrical circuit acts as a means for transmitting electrical signals received from the microphone to the speaker. The AC voltage at node 32 corresponds to the AC voltage across winding 34 of transformer 36 which in turn corresponds to the sounds received by microphone 14. A capacitor 38 is substantially a short circuit between node 32 and a node 40 to the AC electrical signal at node 32. The AC electrical signal at node 40 is then amplified by a first amplifier 42 and a second amplifier 44 before being converted into sound by speaker 20 after being transmitted through an output transformer 46.

When power is available at V1 and microphone switch 15 is not despressed, then power is supplied to noise generator 30 which automatically generates a static electrical signal which is transmitted through the two amplifier stages 42 and 44 and output transformer 46 to speaker 20. Noise generator 30 in combination with amplifiers 42 and 44 and output transformer 46 form one means for generating audible noise from the speaker when the circuit is on and the microphone is off so that the noise heard from speaker 20 sounds similar to the noise heard from a citizens band radio when it is receiving.

Figure 4:
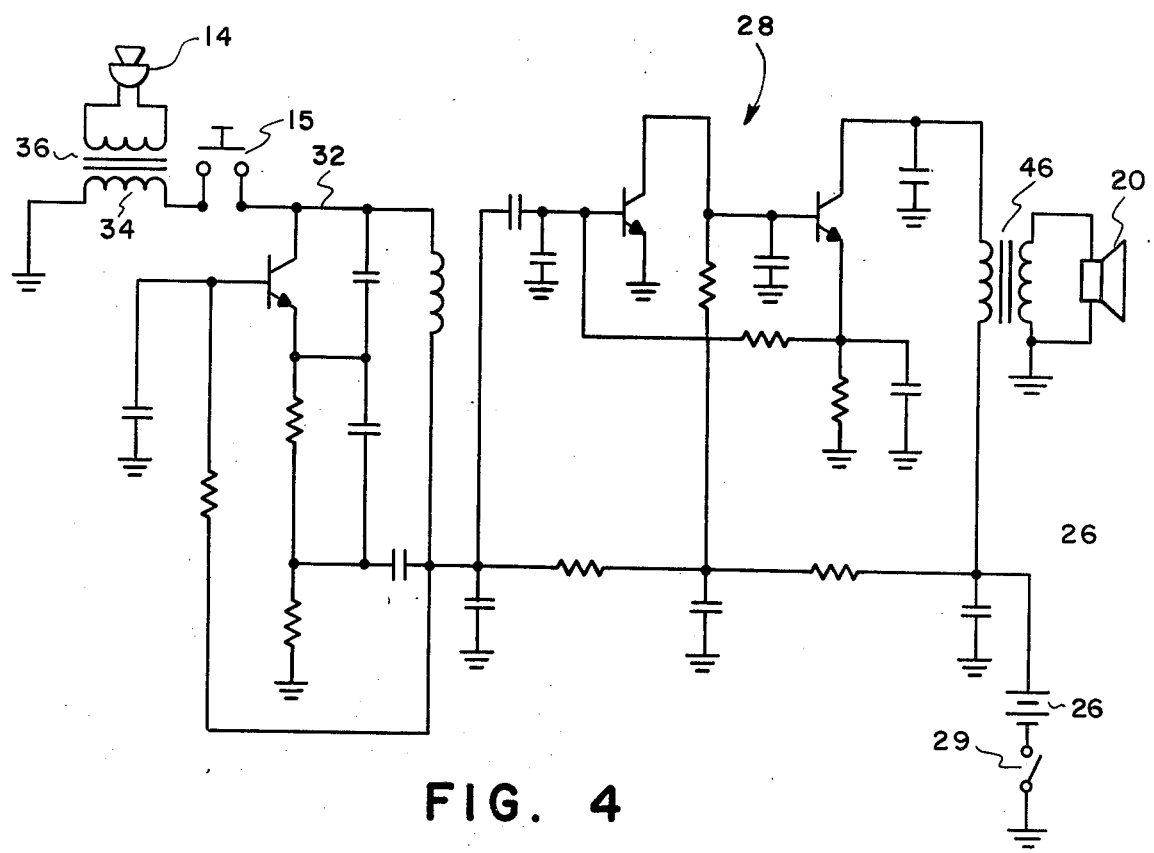
FIG. 4 is a schematic diagram of one form of an electric circuit utilizing this invention.

The electric circuit as shown in FIG. 4 is substantially the same as that shown in FIG. 3. No single capacitor shown in FIG. 4 corresponds to the single capacitor 38 of FIG. 3, and several circuit elements are shared by the various blocks of the block diagram, but the operating principles are substantially the same. Radio antennae 48 are nonfunctional except for providing a realistic appearance.

An electronic horn can be activated by depressing horn button 50. The circuitry for the horn can be entirely separate from that for the CB radio, or various elements can be shared such as speaker 20 or the speaker and amplifiers 42 and 44. An electronic horn which can be sounded by the child adds an additional degree of reality to the toy.

As can be seen from the description, and the accompanying drawings, the present invention is one well suited for providing entertainment for children and allowing children to simulate the actions of adults seen in their everyday world. In particular, the present invention is one well suited to allow children to indulge in fantasies about one of America's favorite folk heros, the trucker. Furthermore, the CB truck toy of this invention can be made as a relatively inexpensive toy.

Figure 5:
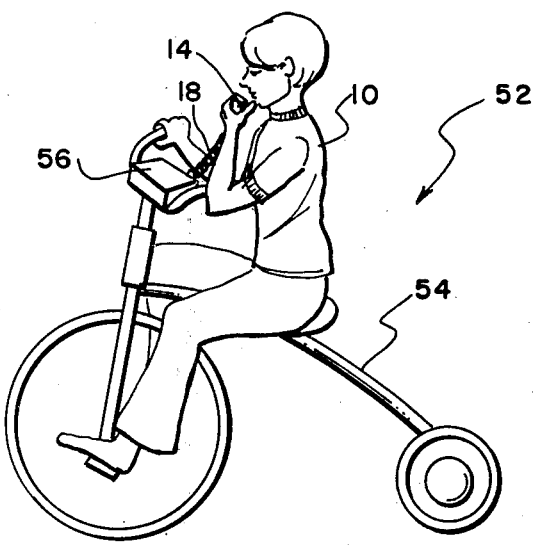
FIG. 5 is a partial representation of a child playing with a toy tricycle according to this invention.

An alternative embodiment 52 of the current invention is a combination toy citizens band radio and other children's vehicle such as a tricycle 54 shown in FIG. 5. In this embodiment the electronics of the invention are preferably enclosed in a case 56 which in appearance looks like a citizens band radio such as installed in cars and trucks. Case 56 can be mounted on or integral with tricycle 54. The electronics of this embodiment function the same as that described in the previous embodiment.

Again, the toy of this invention allows a child to simulate the actions of adults which the child can see in his everyday world. The child can generate his own noise rather than being limited to prerecorded sounds. With the static noise generating feature, the toy radio makes noises similar to a real citizens band radio, and like a real citizens band radio, when transmitting, the noise substantially ceases.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A toy comprising, in combination:
   a toy vehicle;
   an electrical power source;
   a microphone, switchable between on and off, for converting sounds into electrical signals;
   a speaker for converting electrical signals into sound; and
   an electrical amplifier for simulating a CB radio, switchable between on and off, comprising a means for transmitting electrical signals from the microphone to the speaker when the circuit is on and the microphone is on.

2. A toy in accordance with claim 1 further comprising a means for generating simulated radio noise from the speaker when the amplifier is on and the microphone is off.

3. A toy in accordance with claim 2 further comprising an electrical cord connecting the microphone to the electrical amplifier.

4. A toy in accordance with claim 3 further comprising a vehicle body wherein the microphone is detachably mountable on the vehicle body.

5. A toy in accordance with claim 4 further comprising a toy truck.

6. A toy in accordance with claim 5 wherein the speaker is substantially hidden from view in the vehicle body.

7. A toy in accordance with claim 4 further comprising a case for enclosing the electrical amplifier, the electrical power source, and the speaker.

8. A toy citizens band radio adapted to be used with a vehicle toy and an electrical power source comprising, in combination:
   a microphone, switchable between on and off, for converting sounds into electrical signals;
   a speaker for converting electrical signals into sounds;
   an electrical amplifier for simulating a CB radio, switchable between on and off, comprising a means for transmitting electrical signals from the microphone to the speaker when the circuit is on and the microphone is on; and
   a means for generating simulated radio noise from the speaker when the circuit is on and the microphone is off.

* * * * *

UNITED STATES PATENT AND TRADEMARK OFFICE
CERTIFICATE OF CORRECTION

PATENT NO. : 4,186,519

DATED : February 5, 1980

INVENTOR(S) : David F. Repka

It is certified that error appears in the above-identified patent and that said Letters Patent are hereby corrected as shown below:

Column 2, line 12, "partial" should be --pictorial--.

Column 2, line 65, "despressed" should be --depressed--.

Signed and Sealed this

Sixth Day of May 1980

[SEAL]

Attest:

Attesting Officer

SIDNEY A. DIAMOND

Commissioner of Patents and Trademarks